June 23, 1959     A. RUFOLO     2,891,399
DEVICE FOR MEASURING CREEP
Filed Feb. 6, 1957
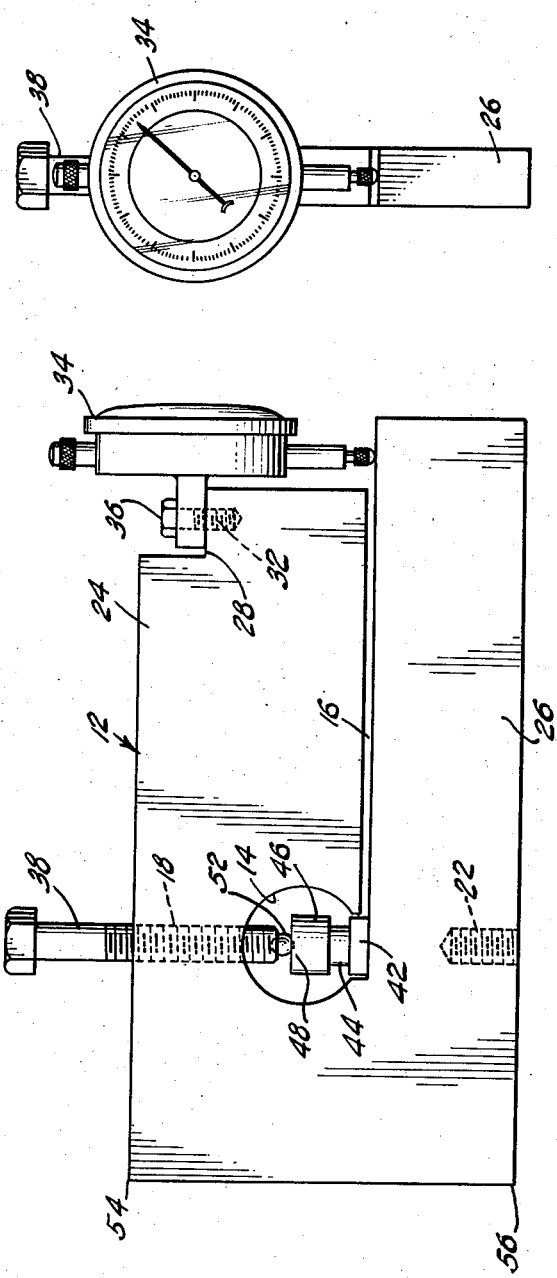
INVENTOR
ANTHONY RUFOLO
BY
ATTORNEYS United States Patent Office 2,891,399
Patented June 23, 1959

2,891,399

DEVICE FOR MEASURING CREEP

Anthony Rufolo, Brooklyn, N.Y.

Application February 6, 1957, Serial No. 638,665

5 Claims. (Cl. 73—94)

(Granted under Title 35, U.S. Code (1952), sec. 266)

The invention described herein may be manufactured and used by or for the Government of the United States of America for government purposes without the payment of any royalties thereon or therefor.

This invention relates to a new type of device for measuring creep and more particularly to a device for measuring creep which is simple, inexpensive, small, portable and can apply a heavy and substantially constant load to a specimen continuously for an extended period of time, can be adjusted for varying the load in very small amounts percentagewise, and can measure extremely small changes in load and in dimensions of the specimen.

Certain materials such as glass-reinforced laminates are used in devices wherein they are subjected to continuous loads in face compression on the order of 20,000 to 30,000 pounds per square inch. Insulating washers, ferrules, and spacer plates located between dissimilar metals in certain structural applications are examples of elements that are subjected to these conditions. Information on the creep properties of materials that are utilized in this manner is indispensable in designing high strength and durable joints. To illustrate, if the magnitude of creep of a laminate is considerably less than bolt elongation in a structural joint, the use of the laminate as a washer or spacer could provide a joint which would remain tight indefinitely.

Investigations of creep properties vary considerably in terms of loading method, load range, duration of load, and the amount of creep of the material. Various well-known types of equipment are utilized for investigating creep in materials under load. Examples of such equipment include a compression test machine, a hydraulic jack and frame device, and a system of levers and dead weights. These equipments are not satisfactory for applying heavy and substantially constant loads for periods on the order of several hundred hours and for varying the load in small amounts percentagewise, and for measuring extremely small changes in load and in dimensions of the specimen. Furthermore where a test extends over a period of weeks it is impractical to use these equipments since tests on several speciments would either entail the use of several such equipments or if tested in succession would stretch out the test period for a year or more. Use of a large compression machine over long periods of time is not feasible; use of a hydraulic jack system is not practical because it is difficult to maintain a constant load for long periods of time; use of a lever system is not practical because it is too large and cumbersome for the loads mentioned above.

This invention concerns a simple, inexpensive, and small device that can provide a heavy, substantially constant and readily controllable load to a specimen and that can indicate extremely small variations in load and in dimension. One form of this invention may include a small steel plate that is formed with a hole extending through its thickness dimension; the hole is made large enough to accommodate a specimen and specimen gripping elements and also to permit insertion and removal of the specimen. The steel plate is slotted through its thickness dimension; the slot is a saw cut and extends from the hole through the other end of the plate. The plate may be considered in terms of a curved bar. The mechanical principle of stresses in a curved bar apply. The steel plate is the body portion of the device. A bolt is threaded into the width dimension of the body and intersects the hole. The bolt is used to develop stress in the body and the load applied to the specimen. A ball pivoted presser foot transmits the load from the end of the bolt to the specimen. A dial gage is secured on one arm of the slotted body and engages the other arm and indicates displacement between the ends of the arms. The length of the arms amplify the displacement in the specimen. The device is calibrated so that it can measure the load applied to a specimen and can measure extremely small variations in dimension of the specimen.

An object of this invention is to provide a device for measuring creep.

Another object is to provide a device for measuring creep that is simple, inexpensive, and small.

Another object is to provide a device for measuring creep that can apply a heavy and substantially constant load to a specimen continuously for an extended period of time.

Another object is to provide a device for measuring extremely small amounts of creep over an extended period of time and can be controlled to vary the load by a very small amount percentagewise.

Another object is to provide a device for use in determining the long-term creep of a material, particularly a laminate, under face compression loading.

Another object is to provide a device for use in determining creep in a material for a broad range of loads and creep characteristics.

Another object is to provide a device capable of measuring an extremely small amount of creep and that is simple in construction and use, inexpensive, small, portable and can apply a heavy and substantially constant load to a specimen continuously for an extended period of time.

Other objects and many of the attendant advantages of this invention will be readily appreciated as the same becomes better understood by reference to the following detailed description when considered in connection with the accompanying drawing wherein:

Fig. 1 is a side view in elevation of an embodiment of this invention, and

Fig. 2 is an end view in elevation of the embodiment of the invention shown in Fig. 1.

The disclosed embodiment of the invention includes a body portion 12 of steel. The body portion 12 is formed with a drilled hole 14, a saw cut 16 that is approximately tangential to the drilled hole 14, and first and second drilled and tapped coaxial holes 18 and 22. The hole 18 has a fine thread. The axis of the holes 18 and 22 either intersects or comes close to intersecting the axis of the drilled hole 14. The saw cut divides the portion of body 12 on one side of hole 14 into an upper arm 24 and a lower arm 26. A portion of the upper arm 24 is cut away at the free end thereof so that the lower arm 26 extends beyond it. The upper arm is formed with a step 28. The step 28 is formed with a drilled and tapped hole 32. A commercial sensitive deflection gage 34 is secured to the upper arm by means of a bolt 36 extending therethrough and into hole 32 and engages the portion of lower arm 26 that juts beyond the upper arm. A bolt 38 with a fine thread and a countersunk tip is assembled in the finely threaded hole 18. A steel anvil 42 formed with a smooth flat surface for supporting a test specimen 44 is disposed on the flattened portion of the hole 14. A steel compressor block 46 formed with one flat surface for engaging the specimen 44 and a conical recess 48 at its other end is disposed on the test specimen. A steel ball 52, e.g., a ball bearing, seats in the recess 48 of the compressor block and in the conical recess at the tip of the bolt.

The body 12 is made from a commercial grade of steel. Steel is used because of its stiffness property. Insofar as the specimens tested are substantially less stiff than steel, the particular grade of steel selected for the body 12 is not critical. The thickness of the steel is determined by practical considerations. The thickness preferably exceeds the width of the test specimen; also the thickness is adequate to accommodate the holes 18 and 22, and can take the load applied to the specimen without being subjected to excessive stress. For loads of about 2000 to 3000 pounds and for specimens about one quarter to one-half inch square, a steel body 12 which is about three-quarters of an inch thick has proven to be satisfactory. The diameter of the hole is made large enough to receive the anvil 42, specimen 44, compressor block 46, and steel ball 52. For specimens that are one-quarter inch thick or less, a hole diameter of one inch to one and one-half inches has proven to be satisfactory. Other dimensions of the invention are selected on the basis of similar practical considerations. For example in an embodiment of the invention as discussed above where the specimen is up to one-half inch square and loaded by about 2000 pounds of force, the thickness of the body 12 and the diameter of hole 14 is as given above; the width of the body 12 is about four inches; the distance between the hole axis and the end of the steel body is about two and one-half inches; the saw cut 16 is about one-eighth inch; the tapped holes 18 and 22 are 3/8—24 threads per inch. The length of the body 12 determines the amplification of the displacement at the specimen; a length of about eight inches will yield an amplification factor of five or six.

There are various modifications contemplated within the scope of this invention. One modification of the invention that has proven to be practical concerns the rounding off of the corners 54 and 56 to reduce the stiffness of the body 12. As the radii of the corners 54 and 56 are made larger the stiffness of the body 12 is reduced without disturbing the linearity of the device. However, a limitation on the size of the radii of the corners 54 and 56 is the minimum cross section or the maximum stress allowable in the stressed portion of the body 12. With reduced stiffness, the same amount of force produces greater displacement of the upper arm 24 relative to the lower arm 26. Another modification concerns forming the body 12 with longer arms 24 and 26. Amplification of the displacement at the specimen is greater if the arms 24 and 26 are longer. Another modification concerns making the compressor block 46 and ball 52 as a universally pivoted presser foot assembly attached to the end of bolt 38. Another modification concerns the elimination of anvil 42 and instead grinding flat the adjacent portion of the body for the purpose of supporting the specimen. Another modification concerns the use of a double collar differentially threaded for use with the bolt 38 for the purpose of providing very fine control in varying load.

Each device is calibrated in a tensile machine by securing a bolt (not shown) in the hole 22 and attaching the bolt to the machine and applying a tension force to the loading bolt 38. This force acts in a direction to unbend the "bent bar" and the resulting deflection at the ends of the arms 24 and 26 is measured by the dial gage. Amount of force applied is varied stepwise from zero to maximum and back to zero and the corresponding values of deflection shown by the gage 34 are recorded. Experience with devices constructed in accordance with this invention have shown that variation of displacement between the arms with load is substantially linear and that the measurements are reproducible with a high degree of precision. A second calibration of each device is made to determine the displacement of the bent bar at the specimen support and substantially along the axis of the bolt 38, corresponding to each of the deflection readings obtained in the preceding calibration procedure. Two strain gages, mounted on either side of the device in the plane of the bolt axis of bolt 38 are used to measure displacement at the specimen. The bolt 38 is used as the loading means. The average of the two strain gage displacement readings for each load setting is taken as the displacement at the bolt. Experience with devices constructed in accordance with this invention have shown that the displacement of the "bent bar" at the specimen support substantially along the axis of the bolt varies linearly with the deflection at the dial gage; therefore the amplification factor is constant. The stability of the device is ascertained by the same method described below for ascertaining creep in a specimen but without using a specimen, i.e., the presser foot bearing directly against the arm 26 of the steel plate.

To test a specimen, it is placed in the device between the compressor block 46 and the anvil 42 and the loading bolt 38 is screwed down until the dial gage indicates a deflection corresponding to the prescribed load. Periodically, dial gage readings are taken and any decrease from the original reading is a measure of the creep in the specimen. If the stability test of the device itself indicates a significant deviation from linearity, this is taken into account in the creep measurements on the specimen by the use of a calibration chart. Experience with the devices described indicate excellent stability and also indicate that dial gage variation is attributable to creep in the specimen. The load is maintained substantially constant, by retightening the load bolts when the dial gage indicates a decrease in load approaching five percent. For a clear picture of the creep characteristic of the specimen, the accumulated creep of the specimen is plotted against length of time under load. The length of time that a specimen is loaded depends upon the rate of change creep in the specimen.

For materials that call for long term tests, multiple testing is a necessary expedient. Under such circumstances, this invention has proven to be of exceptional utility.

Obviously many modifications and variations of the present invention are possible in the light of the above teachings. It is therefore to be understood that within the scope of the appended claims the invention may be practiced otherwise than as specifically described.

I claim:

1. A device for measuring creep in a specimen under compression comprising an elongated plate of a material that is by far stiffer than the specimen material, said plate being formed with a first hole extending through the opposed faces thereof and considerably closer to one end than the other end of said plate, said plate being further formed with a second hole extending transversely through one side and intersecting the first hole, a bolt threadedly engaging said plate for movement into and out of the second hole, said plate further being formed with a substantially straight saw cut substantially perpendicular to the axis of said second hole and extending from said other end and terminating in the first hole, the saw cut defining first and second arms, means disposed at the inner end of said bolt for compressing a test specimen in the first hole, a displacement gage secured to the free end of one of said arms and abutting the other of said arms.

2. A device for measuring creep in a specimen under compression comprising an elongated plate of a material that is by far stiffer than the specimen material, said plate being formed with a first hole extending through the opposed faces thereof and whose axis is considerably closer to one end than the other end of said plate, said plate being further formed with a finely threaded second hole considerably smaller than the first hole and extending transversely through one side and intersecting the first hole, a bolt threadedly engaging said plate in the second hole, said plate further being formed with a substantially straight saw cut substantially perpendicular to the axis of said second hole and extending from said other end and terminating substantially tangentially to the first hole opposite the intersection of the first and second holes, the saw cut defining first and second arms, means disposed between the inner end of said bolt and the opposing side of the first hole for engaging a test specimen, a displacement gage secured to the free end of one of said arms and abutting the other of said arms.

3. A device for measuring creep in a specimen under compression comprising an elongated plate of a material that is by far stiffer than the specimen material, said plate being formed with a first hole extending through the opposed faces thereof and whose axis is considerably closer to one end than the other end of said plate, said plate being further formed with a finely threaded second hole considerably smaller than the first hole and extending transversely through one side and intersecting the first hole, a bolt threadedly engaging said plate in the second hole, said plate further being formed with a substantially straight saw cut substantially perpendicular to the axis of said second hole and extending from said other end and terminating substantially tangentially to the first hole opposite the intersection of the first and second holes, the saw cut defining first and second arms, means disposed between the inner end of said bolt and the opposing side of the first hole for engaging a test specimen, one of said arms being shorter than the other of said arms, a displacement gage secured to the free end of said shorter arm and abutting the other of said arms.

4. A device for measuring creep in a specimen under compression comprising a rectangular plate of steel, said plate being formed with a first hole extending through the opposed faces thereof and whose axis is considerably closer to one end than the other end of said plate, said plate being further formed with a finely threaded second hole considerably smaller than the first hole and extending transversely through one side and intersecting the first hole, a bolt threadedly engaging said plate in the second hole, said plate further being formed with a substantially straight saw cut substantially perpendicular to the axis of said second hole and extending from said other end and terminating substantially tangentially to the first hole opposite the intersection of the first and second holes, the saw cut defining first and second arms, means disposed between the inner end of said bolt and the opposing side of the first hole for engaging a test specimen, one of said arms being shorter than the other of said arms, a displacement gage secured to the free end of said shorter arm and abutting the other of said arms.

5. A device for measuring creep in a specimen over a long time interval comprising: a body member of a material that is by far stiffer than the specimen and having a first arm, a second arm alongside said first arm, and a connecting portion integral with one end of said first arm and one end of said second arm for flexing when transverse force is applied between said arms; means engaging said first arm adjacent said connecting portion and extending toward said second arm substantially transversely thereto and movable toward and away from said second arm for engaging the specimen between the inner end thereof and said second arm and for subjecting the specimen to a preselected force which force is maintained by said flexible connecting portion, the relationship between force applied between said arms by said means and the resultant displacement between the other ends of said arms being known, the latter being an amplification of the corresponding displacement between said arms at said means, and a displacement responsive means for providing information on the amount of displacement between said other ends of said arms.

References Cited in the file of this patent

UNITED STATES PATENTS

| 2,628,496 | Wick | Feb. 17, 1953 |
| 2,709,790 | Swanson | May 31, 1955 |

FOREIGN PATENTS

| 670,603 | Germany | Jan. 21, 1939 |
| 65,502 | France | Oct. 19, 1955 |